United States Patent [19]

Grove

[11] Patent Number: 5,465,989
[45] Date of Patent: Nov. 14, 1995

[54] HAND-POWERED AND CONTROLLED TWO-WHEELED CYCLE FOR THE DISABLED

[76] Inventor: William D. Grove, 1154 Cortland Dr., Lemont, Pa. 16851

[21] Appl. No.: 153,746

[22] Filed: Nov. 17, 1993

[51] Int. Cl.⁶ ............................. B62M 1/14; B62K 3/16; B62H 1/12
[52] U.S. Cl. .................. 280/250; 280/288.1; 280/242.1; 280/291; 280/293; 280/755; 280/764.1
[58] Field of Search ............................. 280/288.1, 226.1, 280/242.1, 249, 250, 291, 293, 298, 755, 763.1, 764.1, 765.1, 767

[56] References Cited

U.S. PATENT DOCUMENTS

| | | | |
|---|---|---|---|
| 1,510,311 | 9/1924 | Cru | 280/293 X |
| 1,938,972 | 12/1933 | Nicholson | 280/293 |
| 3,236,323 | 2/1966 | Austin | 280/293 X |
| 3,485,508 | 12/1969 | Hudnall | 280/291 X |
| 3,848,891 | 11/1974 | Vittori | 280/249 X |
| 3,854,754 | 12/1974 | Jablonski | 280/249 X |
| 3,877,727 | 4/1975 | Johannsen | 280/767 X |
| 4,109,927 | 8/1978 | Harper | 280/242.1 X |
| 4,270,766 | 6/1981 | Thomas | 280/250 X |
| 4,303,255 | 12/1981 | Thomas | 280/250 X |
| 4,695,071 | 9/1987 | Johnston | 280/250 X |
| 5,022,671 | 6/1991 | Jones, Jr. | 280/250 |
| 5,048,864 | 9/1991 | Geiger | 280/767 X |
| 5,169,165 | 12/1992 | Oates | 280/282 X |

FOREIGN PATENT DOCUMENTS 0077278  11/1949  Czechoslovakia ............... 280/291

Primary Examiner—Mitchell J. Hill
Assistant Examiner—F. Zeender
Attorney, Agent, or Firm—Thomas J. Monahan

[57] ABSTRACT

Hand-powered and controlled two-wheeled cycle for use of disabled persons having reduced leg functions. The cycle provides a rapid and efficient means of mobility for leg-disabled persons. A preferred embodiment comprises a cycle having a low rider position, hand-powered and controlled front-drive crank and variable gear propulsion means, braking means, and remotely controlled outrigger means.

20 Claims, 4 Drawing Sheets

HAND-POWERED AND CONTROLLED TWO-WHEELED CYCLE FOR THE DISABLED

BACKGROUND OF THE INVENTION

The present invention relates to two-wheeled vehicles which are motivated by the rider. More specifically, the present invention relates to two-wheeled cycles which are hand-powered and controlled. This invention is designed primarily for physically challenged or disabled individuals who do not have the use of their lower limbs and who wish to ride bicycles as a means of transportation, exercise, sport, or recreational activity.

By way of background, bicycles have been an increasingly popular mode of travel, exercise, and sport. Unfortunately, paraplegics and other disabled individuals with limited use of their legs have been unable to fully experience this popular activity. Such riders are forced to use traditional wheelchairs or tricycles which do not offer the capabilities or popular features of bicycles.

Historically, wheeled vehicles have been used by physically challenged individuals as a means of general transportation. Three-wheeled tricycle-type vehicles have been available as an alternative to the standard four-wheeled wheelchair. The tricycle type has been the preferred vehicle for recreational and sporting activities because of its advantages in speed and maneuverability over the four-wheeled design. Three-wheeled and four-wheeled vehicles have traditionally presented difficulties to their users, particularly in turning corners and in reaching higher rates of speed. Because of the design of the three and four-wheeled vehicles, and their traditional high center of gravity, they have an increased tendency to tip over when turning corners and injure the rider.

Hand-powered two-wheeled vehicles for the physically challenged have also recently become available as an alternative to the three and four-wheeled vehicles. However, the two-wheeled vehicles presently available have drawbacks which are improved by the present invention.

Although the design of two-wheeled vehicles decreases the chance of tipping while riding around corners, they have difficulty in maintaining a vertical position when traveling slowly or in a stopped position thereby subjecting the rider to potential injury.

All existing vehicles also lack full leg support for their users. Current designs, where the rider sits in a recumbent position, offer support only the buttocks and heel of the rider. The present invention also overcomes these obstacles.

The present invention describes a two-wheeled bicycle having a low center of gravity or low center of mass, and retractable wheeled outriggers for added support and stability. The present invention also presents a design which is ideal for use by paraplegics by including a hand-powered crank system with brake and gear shifting controls located on or near the crank assembly for simplified access. The two-wheeled design allows for safer, simplified cornering, especially at higher rates of speed. Stability and support of the vehicle is also greatly improved through the retractable outriggers which can be manually extended to support the vehicle and user in slower or stopped positions. The present invention also contemplates adjustable seats and full leg supports for the user.

The literature is replete with various types of wheeled cycles which are mechanically powered by the rider. For example, front-wheel drive hand-powered cycles are described in U.S. Pat. Nos. 3,848,891; 3,854,754; and 4,109,927.

In addition, outriggers have been utilized in the art for many purposes. For example, Oates (U.S. Pat. No. 5,169,165) describes a two-wheeled scooter which utilizes foot cradles on wheeled, extended mounting arms to allow for rocking of the scooter during use. Geiger (U.S. Pat. No. 5,048,864) describes balance wheels modified to be used on two-wheeled vehicles which are enclosed and protected from the element. Johannsen (U.S. Pat. No. 3,877,727) describes auxiliary bicycle wheels used to assist in the support of traditional bicycles.

To date, there are no known hand-powered and controlled bicycles for easy use of leg disabled persons, in spite of the need for such a devise. Various cycles of the art are cumbersome, unstable, or otherwise design-deficient for safe and convenient use of the physically disabled who have lost the use of, or have diminished use of, their legs.

The present invention utilizes outrigger wheels to meet the specialized needs of physically disabled paraplegics and others with reduced leg functions who wish to ride bicycles. Specifically, hand-powered, two-wheeled vehicles with outriggers which may be remotely controlled by the paraplegic user while riding the vehicle.

The present invention overcomes the above described disadvantages inherent with various cycle apparatuses of the prior art. The invention presents a stable two-wheeled hand-powered and controlled cycle for use by leg-disabled persons.

SUMMARY OF THE INVENTION

In accordance with the present invention, a transportation device for use of disabled persons having reduced leg functions is presented. The device is a hand-powered and controlled two-wheeled cycle which is easily manipulated by leg-disabled persons. A preferred embodiment of the invention comprises a two-wheeled cycle with a main frame, seating means, leg support means, front-drive crank and variable gear propulsion means, braking means, remotely controlled outrigger means, and a low center of mass for high stability.

OBJECTS OF THE INVENTION

An object of the present invention is provide a novel and improved hand-powered and controlled two-wheeled vehicle particularly well suited for use by paraplegics or those having reduced leg functions.

Another object of this invention is to provide a hand-powered and controlled vehicle which has a low center of mass and high vehicular stability at slow, high, and stopped speeds.

A further object of this invention is to provide a hand operated, motivated and controlled two-wheeled vehicle which is capable of the higher speeds and cornering capabilities necessary for competitive use.

Advantages of the present invention over the prior art and a better understanding of the invention and its use will become more apparent from the following disclosure in conjunction with the accompanying drawings wherein are set fully by way of illustration and example, certain embodiments of the invention.

DESCRIPTION OF PREFERRED EMBODIMENTS

Figure 1:
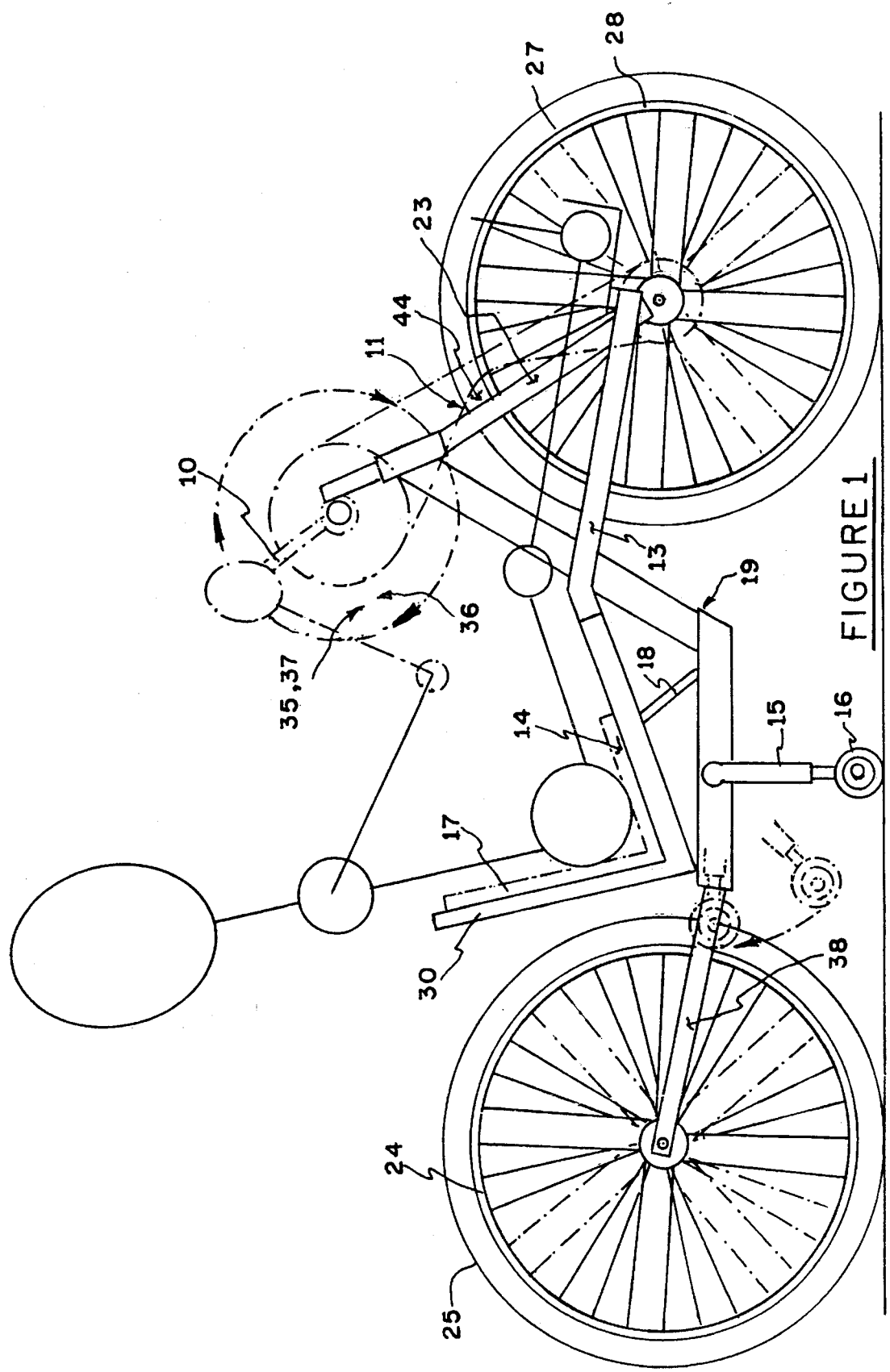
FIG. 1 is a lateral view of a hand-powered and controlled two-wheeled vehicle in accordance with one form of a FIG. 2 is a top view of the FIG. 1 embodiment.
Figure 2:
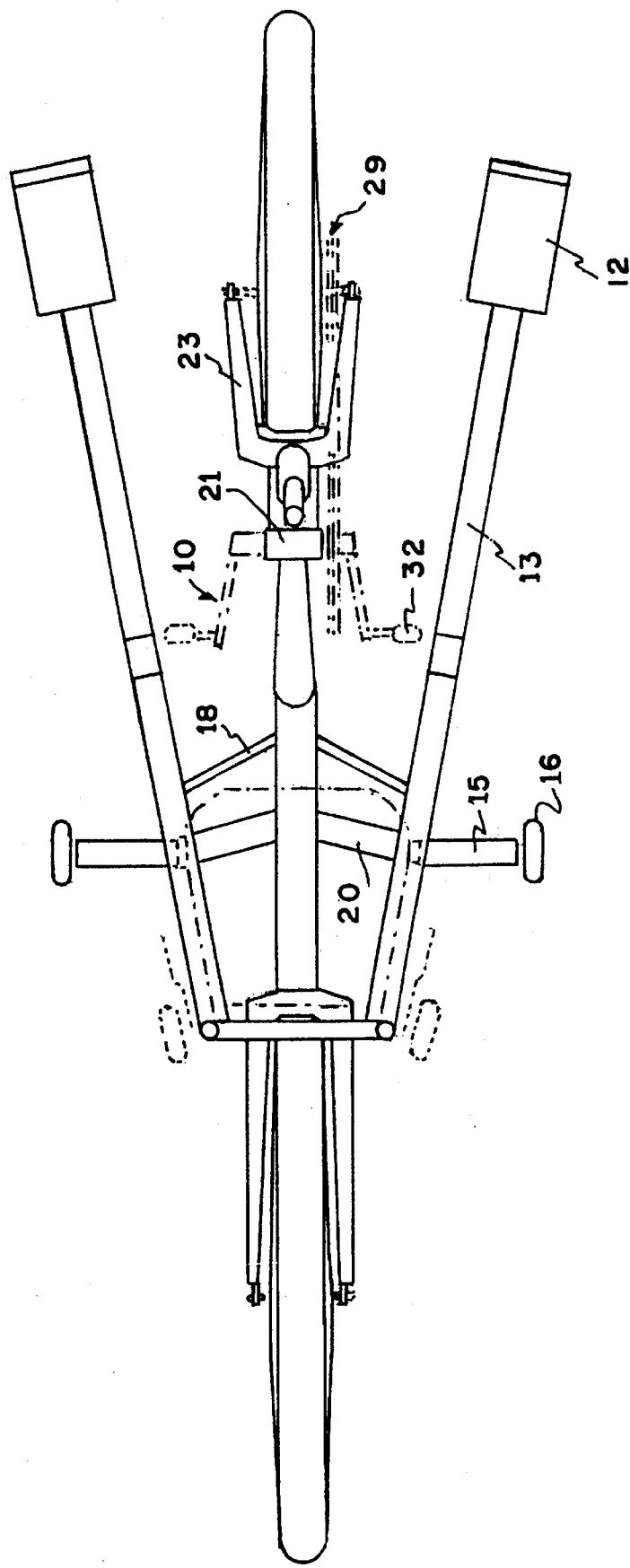
Figure 3:
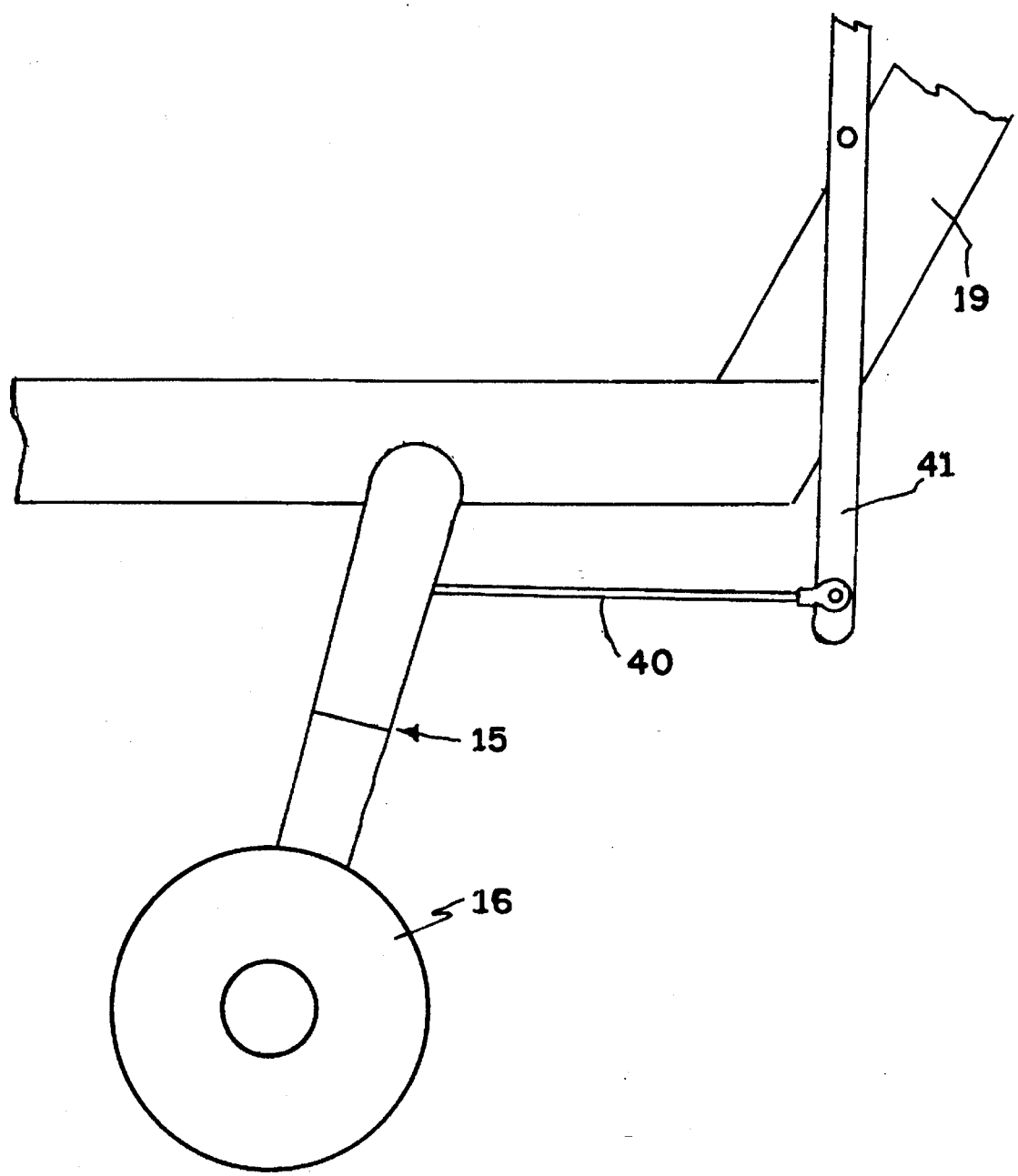
FIG. 3 is a lateral view of the outrigger assembly.

The present invention is a hand-powered and controlled two-wheeled vehicle which offers significant travel and mechanical advantages over present bicycles or tricycles available for paraplegics or others with reduced leg function capabilities.

The main frame of the vehicle is a single spine tube which extends from the rear wheel, extending down and forward below the height of the center of the rear wheel, then to the seat frame, horizontally under the seat frame, and up to the bearing bracket which supports crank type handles, brake and gear shifting controls. The rigid frame may be made of any suitable metal, alloy, or composite material and the like which satisfy the normal strength, weight and flexibility requirements of bicycles (chrome-molybdenum is one such metal construction preferred). The main frame of the vehicle is pivotally attached to the front wheel via a combination steering, powering and control column. The crank-type handlebar arrangement is connected to the column for rotary hand power with this crank mechanism being coupled to the drive hub of the front wheel which is powered with a chain passing through front and rear derailleurs similar to a standard bicycle derailleur and gear assembly. The brake control and gear shift mechanism is also typically attached to this column, but may be located elsewhere. A parking brake may optionally be included on the cycle. The seat is preferably adjustable and located in the center of the vehicle at a lower center of mass or gravity than in traditional vehicles for the physically challenged. This allows the rider to sit in a recumbent position and control the motivation, direction, and speed of the vehicle through the use of his arms.

The right and left crank arms preferably extend from their axle in parallel fashion which permits a rotary power motion with steering capability. Rotatable end knobs or handles or the like are attached to the end of the crank arms.

The larger gear assembly is preferably located on the steering crank assembly and a smaller gear assembly is typically located on the front wheel assembly. The selection of gears provides variable gear ratios and speeds typical of conventional bicycles.

Extending from the seat to each side of the center of the front wheel are telescoping leg supports and foot rests. These leg supports and foot rests offer adjustable full leg support unlike the other available vehicles which offer support only under the buttocks and heel. The supports are also adjustable for a full range of leg lengths types and lengths.

The retractable wheeled outriggers, are located on the main frame with a control cable extending to the main frame of the vehicle. This spring-assisted outrigger is engaged through the use of a handle on the main frame, and the outrigger clips into the extended or retracted position depending on movement of the control handle. The wheeled outrigger assembly consists of a wheel which connects to a telescoping tube. The telescoping tube allows adjustment of the length of the outrigger depending upon stability requirements. The telescoping tube connects to a rotational bearing tube which allows the outrigger to retract into an upward rear position, or be extended at an angle down, and away from the vehicle to support it at slow or stopped speeds. A variety of mechanical, hydraulic, and electronic means, or combinations thereof, could be used to control the retractable wheeled outriggers of the invention. Wheel size, tube length, and positioning of the outriggers may be varied over different designs of the invention consistent with stability and other operational requirements.

A preferred embodiment of the present invention includes a seating surface 30 which is equal to or lower than the height of the wheel axles. This embodiment, as shown in FIG. 1A, allows for greater stability at both low and high speeds of operation.

As mentioned above, the preferred embodiment will be illustrated and described for particular use by a person who has little or no leg function capability available and must rely upon the vehicle configuration for stability. Thus, as illustrated in FIGS. 1, 2, 3, and 4, the preferred embodiment is shown and described as a two-wheeled vehicle which employs a retractable outrigger system to provide support and stability during the slower and stopped speeds. The main frame or chassis 19 as shown is a single, spine tube which extends from the rear wheel 24 at a slightly downward angle to the rear seat support 38 in a horizontal plane to the front seat support 18 then upward at an angle to the bearing bracket which supports the crank handles 10 and steering fork 23. The steering fork 23 extends from the front wheel upward through the bearing bracket 21, where it can be pivoted and turned for steering the vehicle. The crank 10 which has a rotatable end knob 32 extends through the bearing bracket 21 and is terminated with crank type handles 10 which operate derailleur 36 and gear mechanisms 29.

The bearing bracket 21 also supports the front derailleur and gear mechanism 36, gear shifters 37, and brake control 35. The gear shifters 37 and brake control 35 could optionally be located on the crank type handles 10.

The seating frame 30 is located in the center of the vehicle, leaning slightly backward with the buttocks support leaning slightly upward and extending, with the telescoping leg supports 13, and telescoping foot rests 12, to the center and sides of the front wheel 28. The telescoping leg supports 13 and foot rests 12 are on each side of the vehicle to accommodate both legs and extend at a slight angle outward from their attachment to the seating frame 30.

The rotational bearing tubes 20 are rigidly attached to the main frame 19 directly beneath the seating frame 30 and extend vertically and at an angle out from the center of the vehicle. Telescoping tubes 15 are attached on either side of the vehicle to the rotational bearing tubes 20 and terminate with outrigger wheels 16. Control rods 40 attached to the telescoping tubes 15 extend along the frame 19 to a control handle 41. Alternatively, the control rods 40 could be substituted with a chain or wire mechanism.

The chain 11 traverses a chain guide 44. A backrest 17 is fixed to the seating frame and a lower seat is fixed to the right and left leg supports 13.

Figure 4:
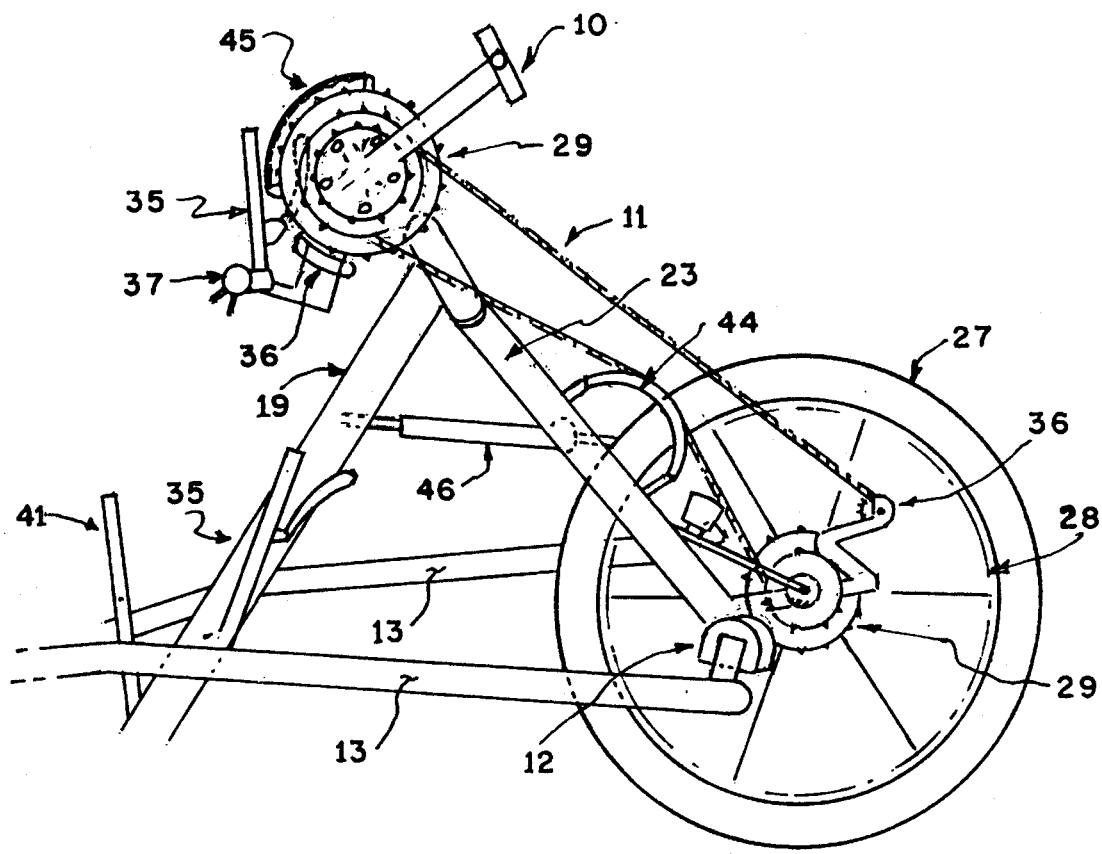
FIG. 4 is a lateral right-hand view of the front wheel assembly.

In FIG. 4, a shock absorber 46, chain guide 44, chain guard 45, gear shifters 37, brakes 35, derailleurs 36, gears 29 and other components of the invention are shown.

Although the present invention has been described with particularity relative to the foregoing exemplary preferred embodiment, various changes, additions, modifications, and applications other than those specifically mentioned will be readily apparent to those having normal skill in the art without departing from the spirit of this invention.

Thus is described my invention and the manner and process of making and using it in such full, clear, concise, and exact terms so as to enable any person skilled in the art to which it pertains, or with which it pertains, or with which it is most nearly connected, to make and use the same.

What is claimed is:

1. A two-wheeled, hand-powered and hand-controlled cycle for leg disabled riders having a front wheel and a rear wheel arranged in the same vertical plane and axially in the same horizontal plane comprising:
    (a) a rigid support frame having a low center of gravity;
    (b) a combination manual steering and powering means for said front wheel of said cycle having hand cranks which extend one from each side of a transverse axles of said steering and powering means and which include handle end knobs which are aligned axially with each other permitting rotary power motion and steering;
    (c) a retractable wheeled outrigger assembly;
    (d) a seating means; and
    (e) a rigid full leg support means for said rider comprising two bars extending from the seating means to its terminus where the feet of said rider rest whereby the seating means is supported by the two bars.

2. A cycle according to claim 1 wherein said retractable outrigger assembly has at least one outrigger wheel.

3. A cycle according to claim 2 wherein said outrigger assembly has two wheels.

4. A cycle according to claim 2 having a braking means and a brake control means.

5. A cycle according to claim 2 wherein said seating means and leg support means are positioned in a horizontal plane a height above the ground not exceeding the height of the horizontal plane of the axles of the front and rear wheels.

6. A cycle according to claim 4 wherein said powering means has adjustable multiple gear means.

7. A cycle according to claim 6 wherein said gear means further comprises a large gear assembly on the combination steering and powering means and a smaller gear assembly on the hub of said front wheel.

8. A cycle according to claim 7 wherein said leg support means is adjustable.

9. A cycle according to claim 7 wherein said seating means is adjustable.

10. A cycle according to claim 6 wherein said leg support means supports a rider's legs in essentially a horizontal position where said legs are parallel to one another.

11. A cycle according to claim 6 wherein said outrigger assembly has a remote control means which is hand activated.

12. A cycle according to claim 6 wherein said brake control means is located in juxtaposition to the combination steering and powering means and to the retractable outrigger assembly.

13. A cycle according to claim 6 wherein said brake means is affixed to one of the front wheel, the rear wheel, and both the front and rear wheels.

14. A cycle according to claim 5 wherein said seating means permits the leg disabled rider to ride in a recumbent position.

15. A cycle according to claim 8 wherein said adjustable leg support means is telescoping.

16. A cycle according to claim 7 wherein said gear means has 21 speeds.

17. A cycle according to claim 1 wherein said frame means is chrome molybdenum.

18. A two-wheeled, hand-powered and hand-controlled cycle for leg disabled riders having a front wheel and a rear wheel arranged in the same vertical plane and axially in the same horizontal plane comprising:
    (a) a rigid support frame having a low center of gravity;
    (b) a combination manual steering and powering means for said front wheel of said cycle having cranks which extend from the axle of said steering and powering means parallel to each other permitting rotary power motion and steering capability;
    (c) a rigid full leg support and seating means comprising two telescoping parallel bars extending the length of the rider's legs between the buttocks and the feet whereby a seat of the cycle is supported by said bars; and
    (d) a retractable wheeled outrigger means.

19. A cycle according to claim 18 wherein said leg support and seating means is essentially positioned in the same or lower horizontal plane as the axles of the front and rear wheels.

20. A cycle according to claim 18 wherein said cycle has a breaking means and a brake control means, adjustable multiple gear means, and adjustable leg support and seating means.

* * * * *